HIGH SPEED ELECTRO-OPTICAL SEMICONDUCTOR DISPLAY APPARATUS

Filed Dec. 24, 1962 2 Sheets-Sheet 1

INVENTORS
ALWIN E. MICHEL
EDWARD J. WALKER
BY [signature]
ATTORNEY

HIGH SPEED ELECTRO-OPTICAL SEMICONDUCTOR DISPLAY APPARATUS

Filed Dec. 24, 1962 2 Sheets-Sheet 2

United States Patent Office 3,308,452
Patented Mar. 7, 1967

3,308,452
HIGH SPEED ELECTRO-OPTICAL SEMICONDUCTOR DISPLAY APPARATUS

Alwin E. Michel, Yorktown Heights, and Edward J. Walker, Ossining, N.Y., assignors to International Business Machines Corporation, New York, N.Y., a corporation of New York Filed Dec. 24, 1962, Ser. No. 246,826
6 Claims. (Cl. 340—324)

The present invention relates to an extremely high speed electro-optical display device and a system incorporating the same; and, more particularly, to such a system utilizing shaped light emitting semiconductor diodes.

In modern technology there are many requirements for the rapid handling of information in electrical signal form which has been transmitted from one location to another or which has been processed by any one of a number of electronic computers or data handling systems. Research is continually in progress to make these computers capable of handling even more complex problems and higher speeds than those at which they are presently capable of operating. However, it has always been a problem to extract information in a form intelligible to human operators at a speed equal to the speed of the computer. In short, the presently available read-out or print-out devices used with present day computer systems imposes a considerable limitation on their speed of operation.

Previous attempts to provide faster and still faster read-out apparatus for use with electronic computing and data processing equipment have, for the most part, been limited to various high speed mechanical printers. In such printers, the basic limitation is, of course, the inertia of the actual moving mechanical parts which puts a severe upper limit on their printing speeds. Thus, present day mechanical printers are both severely limited in their speed range and also extremely expensive. High speed magnetic tape recorders are also used between the computer and the read-out devices; but this is obviously quite costly and further increases the effective cost of such mechanical printers.

Electro-optical display or read-out systems have been devised in the past; however, they have been mostly limited to the Kerr cell type of light switch; wherein, a plurality of Kerr cells are utilized to form alpha-numeric characters upon a suitable photo-sensitive surface. However, while these devices are relatively high speed in nature themselves, they require relatively large voltages to effect the Kerr rotation and the switching speeds are thus severely limited. Also, such systems are quite complex and expensive. These systems are additionally extremely inefficient optically since the source light has to in effect pass through three polarizing elements before ever reaching the photo-sensitive display screen.

It has now been found that an extremely high speed electro-optical display device may be made utilizing a light emissive semi-conductor diode.

It is accordingly, an object of the present invention to provide an extremely high speed electro-optical display device and system utilizing light emissive semiconductor diodes.

It is a further object to provide such a system which is simple and inexpensive to build.

It is yet another object of the present invention to provide such a system wherein direct physical miniaturization of the read-out can be achieved to a degree not hitherto possible in a read-out or display system.

The foregoing and other objects, features and advantages of the invention will be apparent from the following more particular description of preferred embodiments of the invention, as illlustrated in the accompanying drawings.

Figure 1:
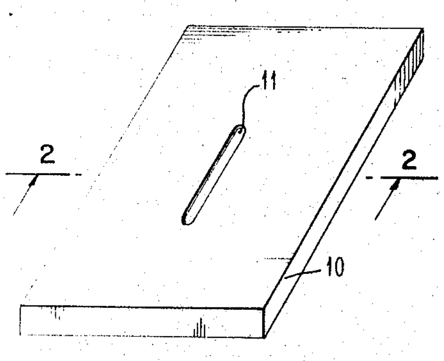
FIGURE 1 is a perspective view of a block of semiconductor material illustrating the first step in making a display device according to the present invention.

The objects of the present invention are accomplished in general by an eletro-optical display device comprising a body of semiconductor material having a shaped light emissive "p-n" junction therein, said junction being shaped such that the intense photon emission emanating from said junction forms a light pattern representative of said shape.

The present invention makes use of the recently discovered phenomenon that certain semiconductor "p-n" junctions emit intense photon radiation from said junction when suitably energized. A more specific description of several such devices will be presented subsequently.

A method is disclosed herein for making a useful electro-optical display device utilizing this phenomenon. A plurality of these devices may further be incorporated into an electro-optical display or read-out system having output speeds far greater than any known in the prior art and which are further capable of producing directly a micro or miniature record without the use of involved optical systems.

As stated previously, it has recently been discovered that intense photon emission occurs at a "p-n" junction in certain semi-conductor materials when the junction is suitably stimulated. A detailed article describing this phenomenon appears in the Proceedings of the IRE, vol. 50, 1962 on pages 1822 and 1823 in an article entitled "Recombination Radiation Emitted by Gallium Arsenide" by R. J. Keys and T. M. Quist of the Lincoln Laboratory at the Massachusetts Institute of Technology. There is an additional article by Michel, Walker and Nathan in the IBM Journal of Research and Development, vol 7, No. 4, pages 70 and 71, January 1963 entitled "Determination of the Active Region in Light Emitting GaAs" which further describes the phenomenon of the light emitting "p-n" junction.

The diodes described in this article were fabricated from single crystal "n" type gallium arsenide. A "p" type layer was formed by diffusing in a sealed evacuated quartz tube, zinc from a dilute solution of zinc and gallium. The wafers so formed were lapped to a thickness of about 0.003 inch and diced. The die were then alloyed to an Au-Sn plated Mo base tab to form one contact after which an indium-zinc sphere was alloyed to the "p" type layer in a position above the hole in the base tab to form the other contact. Tests of this device indicated an efficiency of up to 85% in the conversion of electrical energy input to the device as photon energy output.

Switching times of the device were calculated to be in excess of 100 megacycles. The photon emission of the device emanates from the junction and exhibits a much higher intensity in a direction parallel to the plane of the junction and is a thin very intense line.

The above gallium arsenide light emitting diode is suitable for use with the present invention. However, it is to be understood that it is not intended that the invention be limited thereby. For example, other light emitting semiconductor diodes have been made by suitably doping indium phosphide, gallium phosphide and others.

FIGURES 1–4 illustrate an electro-optic display device and a method of making same for achieving display of alpha-numeric and the like characters utilizing the phenomenon of a light emissive "p-n" junction.

FIGURE 1 is a perspective view of a chip or block of suitably doped semiconductor material such as the "n" type gallium arsenide set forth above, into which a groove 11, representative of an alpha-numeric character, has been machined; such as, by ultrasonic cutting.

Figure 2:
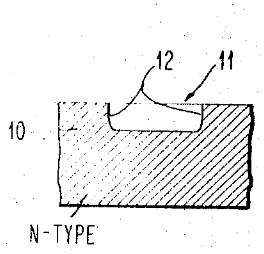
FIGURE 2 is a cross-section of the block of semiconductor material of FIGURE 1.
Figure 6:
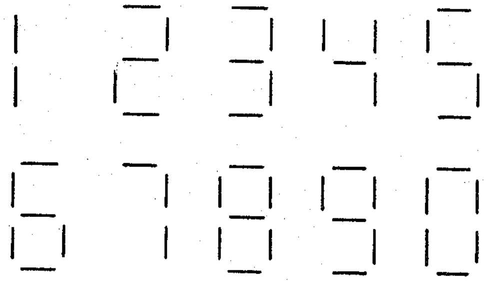
FIGURE 6 is an illustration of the numeric symbols capable of representation by the matrix of FIGURE 5.

FIGURE 2 shows a cross-section of the block 10 of FIGURE 1 and illustrates the shape of the groove 11. It will be noted that the sides 12 of the groove 11 are substantially perpendicular to the surface.

The next step in the process is to suitably diffuse a region of opposite conductivity type determining impurity into the upper surface of the block 10 and the surfaces of the groove 11 by suitable means such as vapor diffusion in an evacuated furnace, as set forth in the above articles or by epitaxial deposition.

Figure 3:
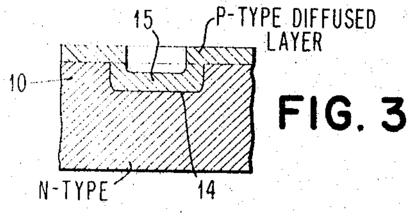
FIGURE 3 is a cross-section of the block of semiconductor material of FIGURE 1 similar to FIGURE 2 illustrating a light emissive "p-n" junction diffused into said block of material.

FIGURE 3 shows the block 10 in cross-section after the diffusion has been completed. It will be seen that a "p" type layer 15 has been diffused into the entire surface of the block forming a "p-n" junction, indicated at 14 beneath the entire surface of the block 10.

Next, an upper planar layer of the block 10 is ground, lapped, etched or otherwise cut away, to remove this portion of the layer, shown as "p" type in FIGURE 3, from the planar surface of block 10. The result of this operation is clearly shown in FIGURE 4. It may be seen in this figure that the edge 16 of the "p-n" junction 14 remaining is thus directly exposed to the surface of the block 10 and at this point is substantially perpendicular to said surface.

As will be understood from the above discussion, when suitable electrical potential is applied across the "p-n" junction formed within the block 10, the upper edge 16 of the "p-n" junction will be caused to emit high intensity photon radiation. Ohmic contacts may be made to the respective "p" and "n" regions of the device by suitable methods well known in the art.

Any desired alpha-numeric or other character may be made in the manner outlined above. The significant feature of this invention is that it provides a shaped "p-n" junction which is shaped in the optimum plane of observation and is perpendicular to said plane to effect a very bright, observable or recordable figure.

The above process will provide a double line image since both of the exposed edges will emit light at the planar surface. If it is desired, a single line figure may be obtained in a number of ways such, for example, as grinding away one of the edges since the light will be emitted at the desired high intensity levels in the plane of observation only from that portion of the junction perpendicular thereto. Other methods of forming such a single line figure are obviously possible.

The actual width of the emitting line in such a device is presently on the order of 10 microns. Thus, it is conceivable that individual display devices could be made as small as 100 x 100 microns. Further, even with this infinitesimally small size the intensity of the emission is sufficient that it would be adequate for recording or exposing photographic film. Also, as stated above, such a device could be turned off and on at rates up to 100 megacycles. Thus, assuming that a suitable recording medium could be moved past such a device at a sufficiently rapid rate of speed, it is possible to record a hundred million characters a second utilizing such a device. No known mechanical printer or electro-optical display device is capable of even approaching such recording or read-out speeds or is capable of being made in such a small physical size.

The significance of this latter characteristic is that a matrix of such devices could be utilized to directly produce the microfilm type of record. This latter feature is of considerable interest in view of the recent intense activity in the field of microminiaturizing records. Most of these microminiaturization systems utilize various types of microfilming techniques and require expensive and complicated machines and processes. Utilizing a display system of the present invention, miniaturized records could be made directly without requiring subsequent miniaturization by such techniques.

Figure 5:
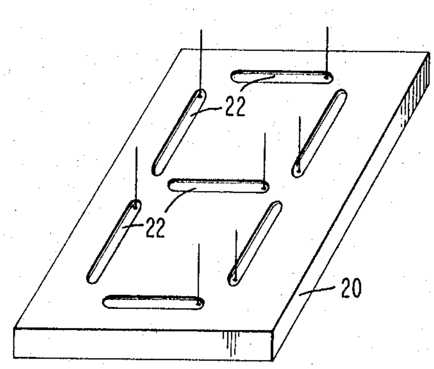
FIGURE 5 is a perspective view of a matrix type alphanumeric display device constructed in accordance with the principles of the invention.
Figure 8:
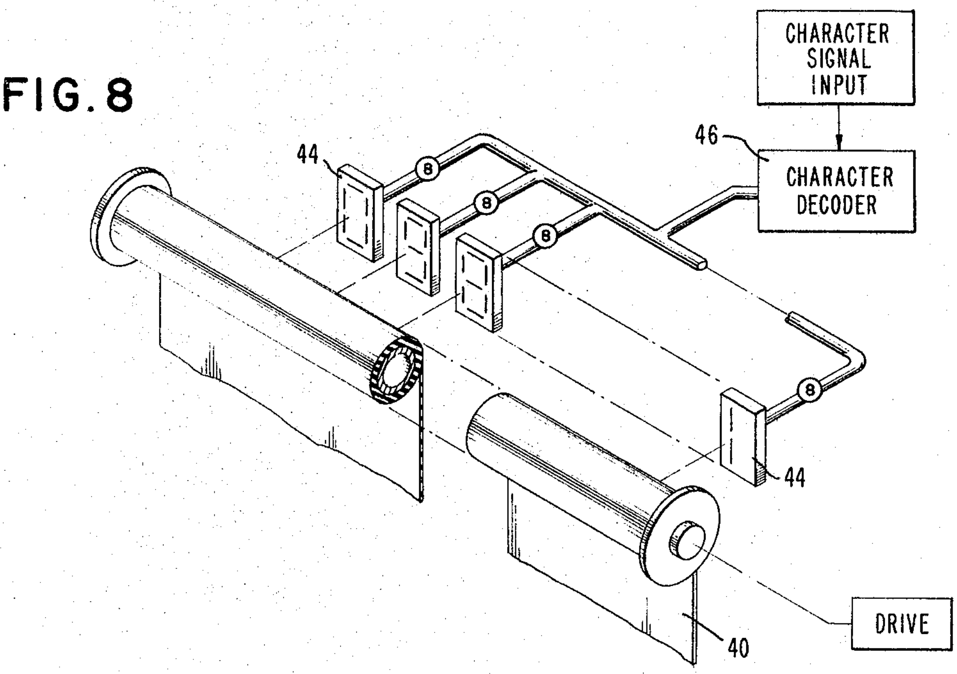
FIGURE 8 is a schematic representation of one embodiment of a complete electro-optical read-out system constructed in accordance with the present invention.

One embodiment of an electro-optical display and recording device matrix constructed in accordance with the present invention is illustrated in FIGURE 5. This type of a printing matrix configuration is not novel in itself as it is often utilized in the magnetic printing arts to magnetize certain desired areas of a magnetizable medium which are subsequently dusted with magnetic particles to achieve a visible print-out. The type of print-out obtainable with such a numerical matrix is illustrated in FIGURE 8. It is obvious that other similar matrices could be designed for providing alphabet, and the like figures.

The matrix of FIGURE 5 is constructed in a manner similar to the simple device illustrated in FIGURES 1–4, wherein the plurality of bars 22 are formed in a block of semiconductor material 20 in the same way that the groove 12 was cut into the block 10 of FIGURE 1. Thus, with the finished device of FIGURE 5 after suitable connections are made any one or combination of the matrix elements 22 can be made to emit intense radiation as outlined above. Any combination of these matrix elements 22 may be chosen by suitable switching means well known in the art for forming the characters illustrated by way of example in FIGURE 8.

Figure 7:
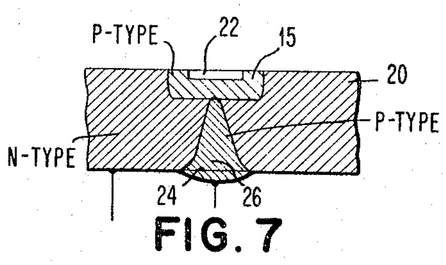
FIGURE 7 is a cross-section of an electro-optical display device constructed in accordance with the present invention similar to FIGURE 4 illustrating one way of making an electrical connection to the device.
Figure 4:
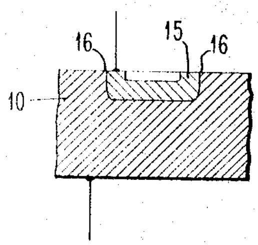
FIGURE 4 is a cross-sectional view of the block of FIGURE 1 after a second fabrication step.

In order to avoid having the ohmic contacts and their associated leads on the surface of the display device an alternative method of making contact with the conductivity type region within the surface of the groove 22 is illustrated in FIGURE 7. This method is well known in the art and, briefly stated, comprises alloying into the rear surface of the block 10 a dot 24 of the same conductivity type impurity material as of the upper layer 15. This operation forms a region 26 which penetrates through the "n" type region and makes electrical contact with the "p" type layer 15. Electrical contact may now be made to the upper layer 15 through the alloy dot 24 and the region 26.

By the method outlined above, all of the electrical contacts to the individual components of the matrix element 20 of FIGURE 5 can be made from the rear side of the element and won't interfere with the observation or photographic recording of figures appearing on the face of the device.

FIGURE 8 schematically depicts an electro-optical recording system utilizing a plurality of the matrix devices illustrated in FIGURE 5. Such a basic system comprises a roll of photo-sensitive material, such for example as photographic film 40, having suitable film driving means 42 for passing same past the matrix at a desired speed. The matrix elements 44 are arranged in a suitable row to obtain conventional character print-out. The character decoder 46 is of a type well known in the art. Such a decoder would, for example, accept binary information either serially or parallelly and automatically selects and energizes that combination of matrix elements 22 which corresponds to the characters fed into the decoder in binary form. Such a system as stated previously, is capable of printing out extremely large numbers of characters in a short time.

It may be seen that the primary limitation on the read-out speed of the instant system is the actual speed limitation of moving the film or recording media rather than in the switching times of the display elements.

Figure 9:
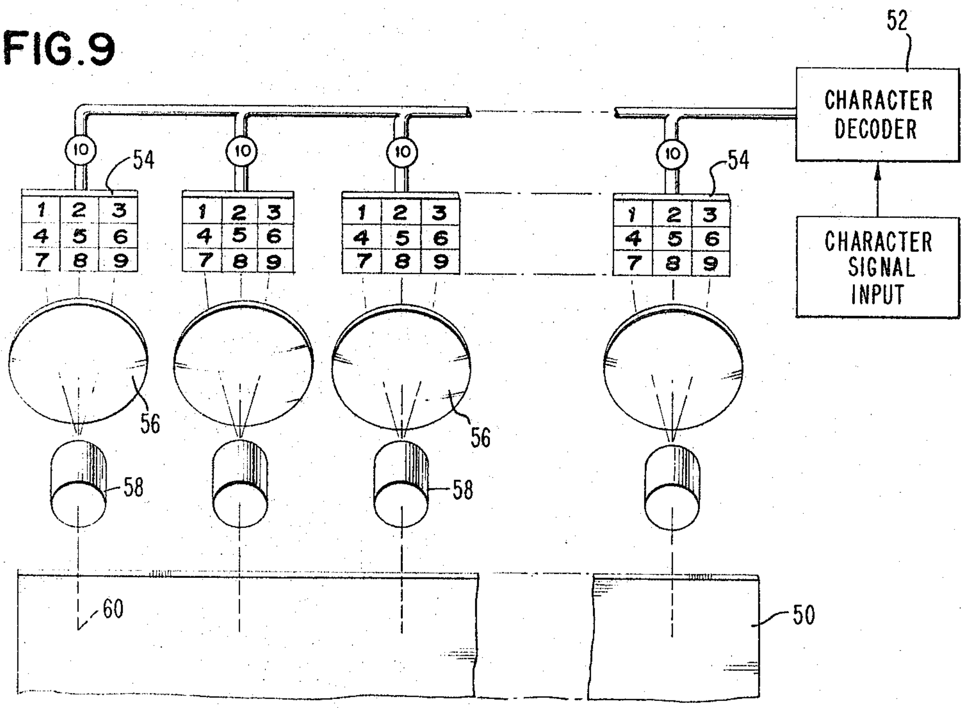
FIGURE 9 is a schematic representation of an alternate embodiment of an electro-optical display system constructed in accordance with the present invention.

An alternate embodiment of an electro-optical recording system constructed in accordance with the present invention is disclosed in FIGURE 9. In this embodiment the film or other photosensitive recording media 50 is moved past the recording position in the same manner as that of FIGURE 8. However, in this embodiment instead of the single matrix element utilized to form various alpha-numeric characters a plurality of individual shaped emissive junction devices 54 is utilized for each recording position wherein each such device has a complete alpha-numeric or similar character formed on its surface. The numeric characters are intended to be illustrative only. In this device, the character decoder 52 operates in substantially the same manner as decoder 46 of FIGURE 8 in that, it accepts for example, binary information and selects a particular one of the characters at each location to be illuminated in a read cycle according to such input. The optics of this system provide that when any of the plurality of characters 54 is illuminated, the light will be collected by lens 56 and passed through reflecting elements 58 which latter element functions to collect the light from the different located members of the display matrix 54 and focuses it upon the same spot 60 on the photo-sensitive media 50. This optical system is merely one way of focusing the plurality of individual display devices on a single spot and is intended to be illustrative only. A more complete discussion of this type of optical system is set forth in Patent No. 2,887,935 of L. V. Scott et al.

The high speed recording system of FIGURE 9 would operate in substantially the same manner and at substantially the same speeds as that of FIGURE 8. It has the possible advantage of printing out a more widely varied type of character which might be desired for some applications. The intense radiation available from the display devices 54 allows the use of such an optical system which would not be feasible or entirely satisfactory with systems not having such intense light sources.

It should also be noted that such devices can also be utilized for visual display, however, the high speed recording systems disclosed utilize to the greatest degree the inherent unique properties of the device of the invention.

In summation, there has thus been disclosed and described a novel electro-optical display device having switching speeds far in excess of any other device presently known in this field. Such a device can further be used for micro or miniaturized recording due to the novel manner in which it may be constructed and also to the intense light source available which provides sufficient light for recording even in extremely small sizes. Integrated electro-optical read-out and recording systems for use with high speed computers can be constructed in accordance with the invention having read-out or printing speeds far in excess of those available in present day mechanical printers or optical recording systems. It may further be seen from the above description that the apparatus required for such a read-out system is relatively simple and straight-forward requiring only a series of display devices, a recording sheet and a relatively simple switching or character decoding system for selecting the proper display devices to be energized at a given time.

It should further be noted that that term "alpha-numeric symbol" as used herein is intended to refer not only to the letters of the alphabet and arabic numerals but also to any information symbol which it might be desired to represent in printed form. For example, mathematical, scientific punctuation and any other similar symbol could be formed on an electro-optical display device as envisioned by the invention.

While the invention has been particularly shown and described with reference to preferred embodiments thereof, it will be understood by those skilled in the art that various changes in form and details may be made therein without departing from the spirit and scope of the invention.

What is claimed is:

1. An electro-optical display device comprising a body of semiconductor material
- (a) having at least one substantial planar surface and
- (b) having at least one light emissive "p–n" junction therein, said junction being shaped in a form capable of alpha-numeric representation and means for viewing said planar surface in a direction substantially perpendicular thereto to enable detection of shaped forms when the junction is energized.

2. An electro-optical display device comprising a body of semiconductor material
- (a) having at least one substantially planar surface and
- (b) having at least one light emissive "p-n" junction therein,
- (c) said junction being shaped in a form capable of alpha-numeric representation and
- (d) said junction being perpendicular to the planar surface of said body, and means for viewing said planar surface in a direction substantially perpendicular thereto to enable detection of said shaped forms when the junction is energized.

3. A high speed electro-optical recording system comprising
- a plurality of electro-optical display device matrices, each matrix comprising a plurality of shaped light emissive "p-n" junctions whose shapes are capable of alpha-numeric representation,
- means for selectively and simultaneously energizing a plurality of desired member components of each matrix to effect an optical information display,
- photo-sensitive recording means located in light exchange relationship with respect to said optical display,
- said matrices being so positioned with respect to each other that their images fall in transversely displaced locations on the photo-sensitive means with respect to the direction of motion thereof, and
- means for moving the photo-sensitive means past the matrices at a desired speed.

4. A high speed electro-optical recording system as set forth in claim 3 wherein each matrix comprises
- a plurality of separately energizable light emitting "p-n" junctions wherein various combinations of said junctions form different alpha-numeric symbol representations, and
- means are provided for each matrix for sequentially selecting and energizing said combinations of junctions.

5. A high speed electro-optical recording system as set forth in claim 3 wherein each matrix comprises a plurality of separately energizable light emitting "p-n" junctions wherein each junction is shaped in a form representative of an alpha-numeric character,
- means for projecting the image of all of the characters of a given matrix to a common location on the photosensitive recording medium, and
- means for selectively energizing one of the junctions of each matrix in response to an input signal.

6. An electro-optical display device comprising a body of semiconductor material having at least one substantially planar surface, having a plurality of light emissive "p-n" junctions therein, various combinations of said junctions being capable of representing different alpha-numeric characters, said junctions being substantially perpendicular to the planar surface of said body, and means for selectively energizing said junctions to form desired alpha-numeric character representations.

References Cited by the Examiner

UNITED STATES PATENTS

| | | | |
|---|---|---|---|
| 2,817,783 | 12/1957 | Loebner | 313—108.1 |
| 2,909,972 | 10/1959 | De Lano | 340—154 X |
| 3,066,242 | 11/1962 | Boyd | 313—108.1 |

NEIL C. READ, *Primary Examiner.*

H. PITTS, *Assistant Examiner.*